United States Patent
Yoneda et al.

(10) Patent No.: US 8,957,163 B2
(45) Date of Patent: Feb. 17, 2015

(54) GRAFT POLYMER WITH HYDROCARBON GROUP AND METHOD FOR PRODUCING THE SAME

(75) Inventors: Atsuro Yoneda, Toyonaka (JP); Akiko Hemmi, Osaka (JP)

(73) Assignee: Nippon Shokubai Co., Ltd., Osaka-Shi, Osaka (JP)

( * ) Notice: Subject to any disclaimer, the term of this patent is extended or adjusted under 35 U.S.C. 154(b) by 759 days.

(21) Appl. No.: 12/160,033

(22) PCT Filed: Mar. 23, 2007

(86) PCT No.: PCT/JP2007/057020
§ 371 (c)(1),
(2), (4) Date: Jul. 3, 2008

(87) PCT Pub. No.: WO2007/111378
PCT Pub. Date: Oct. 4, 2007

(65) Prior Publication Data
US 2009/0099053 A1  Apr. 16, 2009

(30) Foreign Application Priority Data
Mar. 24, 2006 (JP) ................... 2006-083817

(51) Int. Cl.
*C08F 283/06* (2006.01)
*C08L 51/08* (2006.01)

(52) U.S. Cl.
CPC ............... *C08F 283/06* (2013.01); *C08L 51/08* (2013.01)
USPC ........... 525/404; 525/244; 510/276; 528/366; 528/321

(58) Field of Classification Search
CPC ............................. C08F 283/06; C08L 51/08
USPC ............ 525/244, 404; 510/276; 528/366, 321
See application file for complete search history.

(56) References Cited

U.S. PATENT DOCUMENTS

| | | | |
|---|---|---|---|
| 3,337,516 A | 8/1967 | Stuart et al. | |
| 4,612,352 A | 9/1986 | Schäfer et al. | |
| 4,705,525 A | 11/1987 | Abel et al. | |
| 4,797,223 A * | 1/1989 | Amick et al. | 510/223 |
| 5,130,369 A * | 7/1992 | Hughes et al. | 524/846 |
| 6,403,545 B1 * | 6/2002 | Karls et al. | 510/181 |
| 6,447,696 B1 | 9/2002 | Takagi et al. | |
| 2001/0036912 A1 * | 11/2001 | Shulman et al. | 510/475 |
| 2002/0004559 A1 * | 1/2002 | Hirata et al. | 525/187 |
| 2004/0033929 A1 | 2/2004 | Bertleff et al. | |

FOREIGN PATENT DOCUMENTS

| | | |
|---|---|---|
| DE | 100 50 958 A1 | 4/2002 |
| EP | 0 639 592 A1 | 8/1994 |
| EP | 0 639 592 A1 | 2/1995 |
| EP | 0 850 963 A1 | 12/1997 |
| EP | 1 238 992 A2 | 3/2002 |
| EP | 1 528 071 A1 | 10/2004 |
| JP | 58-109700 A | 6/1983 |
| JP | 59-62614 A | 4/1984 |
| JP | 62-4712 | 1/1987 |
| JP | 2002-332391 A | 11/2002 |
| WO | WO 2006/132385 A1 | 12/2006 |

OTHER PUBLICATIONS

Snapshot of Graft Copolymers website 2014.*
European Office Action issued Aug. 27, 2010, in corresponding European Patent Application No. 07 740 458.0.
Louis Ho Tan Tai, "Formulating Detergents and Personal Care Products," AOCS Press, Champaign, IL, pp. 52-55 (2000)—.
Office Action issued Jan. 8, 2010 in corresponding Chinese Patent Application No. 2007800097378, and English translation thereof.
Office Action from the State Intellectual Property Office of P.R. China issued in Applicant's corresponding Chinese Patent Application No. 200780009737.8 dated Sep. 7, 2010, with English translation thereof.
Office Action from the State Intellectual Property Office of P.R. China issued in corresponding Chinese Patent Application No. 200780009737.8 dated Jan. 12, 2011, with an English translation thereof.
Hawley's Condensed Chemical Dictionary, Thirteenth Edition, (1997), p. 549, John Wiley & Sons, Inc.

* cited by examiner

*Primary Examiner* — Mark Kaucher
(74) *Attorney, Agent, or Firm* — Buchanan Ingersoll & Rooney PC

(57) ABSTRACT

Provided is a polymer-based detergent builder which is capable of effectively suppressing deposition of a surfactant, and effectively preventing soil re-deposition, even in washing using high hardness water. Provided is a graft polymer with a hydrocarbon group made by graft polymerization of monomer components containing a hydrophilic monomer having an anionic group or a hydroxyl group, on a polyoxyalkylene-based compound represented by the following formula (1):

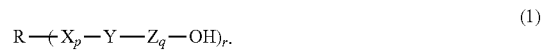

(1)

20 Claims, No Drawings

GRAFT POLYMER WITH HYDROCARBON GROUP AND METHOD FOR PRODUCING THE SAME

TECHNICAL FIELD

The present invention relates to a graft polymer with a hydrocarbon group, and a method for producing the same. In more detail, the present invention relates to a graft polymer with a hydrocarbon group, excellent in performance as a detergent builder, and a method for producing the same.

BACKGROUND ART

Conventionally, in a detergent used for clothing, a detergent builder (a detergent auxiliary) such as zeolite, carboxymethyl cellulose and polyethylene glycol has been formulated to improve washing effect of a detergent.

Also, recently, in addition to the above various detergent builders, a polymer is formulated in a detergent composition as a detergent builder.

For example, use of a water-soluble and water-dispersion type graft polymer having predetermined amount of a graft component and a hydrophobic residue, bound with the graft component via a polyglycol ether chain having predetermined chain length, as a detergent builder, is disclosed (see JP-A-59-62614).

In addition, a graft polymer composition, as a detergent particularly suitable to a liquid detergent, is disclosed as containing 2 or more kinds of graft polymers obtained by graft polymerization of monomer components containing an unsaturated carboxylic acid-based monomer, onto a main chain containing a polyether moiety, wherein number of carbon atoms of terminal structure units differ by equal to or more than 3, when the numbers of carbon atoms composing the structure units located at both terminals of each of main chains, between 2 kinds of graft polymers among the 2 or more kinds of graft polymers, are compared with, under predetermined condition (see JP-A-2002-332391).

It should be noted that, performances presently required to a detergent builder include not only performance to improve washing capability of a detergent, as a matter of course, but also performance to suppress/prevent deposition of a surfactant or soil re-deposition. Here, the deposition problem of a surfactant is more apparent in washing using water with relatively high hardness, because the deposition is generated by bonding of straight chain alkylbenzene sulfonic acid (or a salt) (LAS) such as dodecylbenzene sulfonic acid, that is an anionic surfactant, with calcium ions or magnesium ions present in water (see Louis Ho Tan Tai, "Formulating Detergent and Personal Care Products" AOCS Press, pp 53 to 54 (2000)).

However, any of the above graft polymers, when used as detergent builders, did not necessarily satisfy performance to suppress deposition of a surfactant (hereafter may be referred to as simply "deposition suppression capability") and/or performance to suppress soil (in particular, hydrophobic soil such as clay) re-deposition (hereafter may referred to as simply "prevention capability of soil re-deposition").

Note that, although not for an application of a detergent builder, a graft polymer having a structure similar to that of the above polymer is also known; for example, as a graft polymer used as a paper surface processing agent, a graft polymer obtained by graft polymerization of a polyether (A), a predetermined ethylene-type unsaturated monomer (B) and, if necessary, other monomers (C), in predetermined ratio, is known (see JP-A-58-109700). Further, as a graft polymer used as a dye or a fluorescent whitening agent, a graft polymer obtained by containing side chains derived from an ethylene-type unsaturated monomer, onto carbon atoms of polyalkylene glycol ether chains, where 2 terminal hydroxyl groups of polyalkylene glycol are esterified by a C8 to C26 fatty acid, is known (see JP-A-62-4712).

DISCLOSURE OF THE INVENTION

Thus, although various graft polymers have conventionally been reported as above, there are no graft polymers being capable of exerting excellent performance both in deposition suppression capability and prevention capability of soil re-deposition, when used as a detergent builder, and therefore development of a detergent builder (a graft polymer) sufficiently exerting the above both performances is still desired at present.

In view of such a situation, it is an object of the present invention to provide a polymer-based detergent builder which is capable of effectively suppressing deposition of a surfactant, and effectively preventing soil re-deposition, even in washing using high hardness water.

In addition, it is an object of the present invention to provide an efficient production method for such a polymer.

The present inventors have intensively studied a way to solve the above problems; and as a result, have found that a graft polymer with a hydrocarbon group, obtained by graft polymerization of monomer components containing a predetermined hydrophilic monomer, onto a predetermined polyoxyalkylene-based compound containing a hydrocarbon group is capable of exerting excellent performance as a detergent builder, specifically excellent in deposition suppression capability and prevention capability of soil re-deposition. In addition, the present inventors have searched, during the study process, reasons for not necessarily being able to obtain excellent deposition suppression capability or prevention capability of soil re-deposition, when the graft polymer, described in the above JP-A-59-62614, was used as a detergent builder; as a result, have found that even by trying to obtain a graft polymer by emulsion polymerization as described in JP-A-59-62614, a component intended to graft not necessarily grafted completely onto a polyglycol ether chain, and certain parts of polymers different from an objective polymer were formed (for example, polyacrylic acid). Based on the idea that the above polymer structure is the reason for not sufficiently exerting performance as a graft polymer-based detergent builder, the present inventors have carried out a graft polymerization reaction in a reaction system using only a small amount of a solvent, and have found that a desired graft polymer is surely obtained; and have thus completed the present invention.

Namely, according to a first aspect of the present invention, a graft polymer with a hydrocarbon group made by graft polymerization of monomer components containing a hydrophilic monomer having an anionic group or a hydroxyl group, on a polyoxyalkylene-based compound represented by the following formula (1):

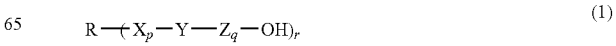

wherein R represents a straight chain or branched C10 to C20 alkyl or alkenyl group; X represents:

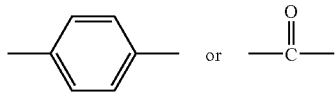

p represents 0 or 1; Y represents:

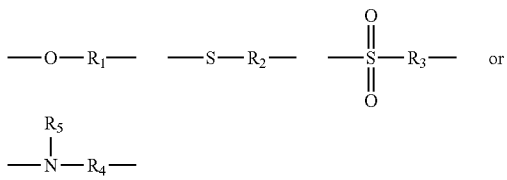

wherein $R_1$ to $R_4$ represent a C2 to C6 alkylene group; $R_5$ represents hydrogen atom, or a group represented by the following formula (2):

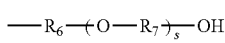

(2)

wherein $R_6$ and $R_7$ represent a C2 to C20 alkylene group; s represents an integer of 0 to 200;
Z represents a C2 to C20 oxyalkylene group; q represents an integer of 17 to 200; and r represents an integer of 1 to 6;
is provided.

In addition, according to a second aspect of the present invention, a method for producing a graft polymer with a hydrocarbon group, in a reaction system where content of a solvent is equal to or less than 10% by mass, relative to total amount of the reaction system, under temperature condition of equal to or higher than 100° C., having a step for graft polymerization of monomer components containing a hydrophilic monomer having an anionic group or a hydroxyl group, on a polyoxyalkylene-based compound represented by the following formula (1):

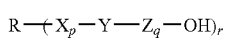

(1)

wherein R represents a straight chain or branched C10 to C20 alkyl or alkenyl group; X represents:

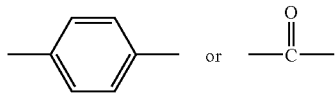

p represents 0 or 1; Y represents:

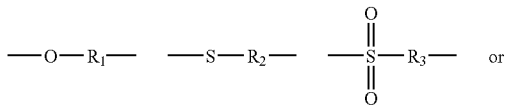

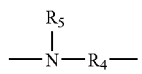

wherein $R_1$ to $R_4$ represent a C2 to C6 alkylene group; $R_5$ represents a hydrogen atom, or a group represented by the following formula (2):

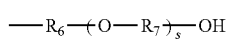

(2)

wherein $R_6$ and $R_7$ represent a C2 to C20 alkylene group; s represents an integer of 0 to 200;
Z represents a C2 to C20 oxyalkylene group; q represents an integer of 17 to 200; and r represents an integer of 1 to 6;
is provided.

In addition, according to a third aspect of the present invention, a detergent composition containing the above graft polymer with a hydrocarbon group, or a washing method using the same is provided.

Further other objects, features and merits of the present invention will be clear by referring to preferable embodiments to be exemplified in explanation given below.

DETAILED DESCRIPTION OF THE EMBODIMENT

The present invention will be explained in detail below by dividing into several embodiments, however, the scope of the present invention should be determined based on description in claims, and should not be limited by the following specific embodiments.

The first aspect of the present invention relates to a graft polymer with a hydrocarbon group. Specifically, the first aspect of the present invention is a graft polymer with a hydrocarbon group made by graft polymerization of monomer components containing a hydrophilic monomer having an anionic group or a hydroxyl group, on a polyoxyalkylene-based compound represented by the following formula (1):

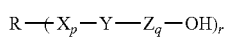

(1)

wherein R represents a straight chain or branched C10 to C20 alkyl or alkenyl group; X represents:

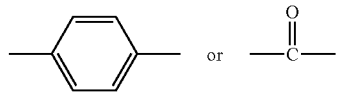

p represents 0 or 1; Y represents:

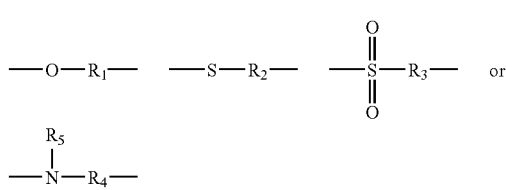

wherein $R_1$ to $R_4$ represent a C2 to C6 alkylene group; $R_5$ represents a hydrogen atom, or a group represented by the following formula (2):

(2)

wherein $R_6$ and $R_7$ represent a C2 to C20 alkylene group; s represents an integer of 0 to 200;
Z represents a C2 to C20 oxyalkylene group; q represents an integer of 17 to 200; and r represents an integer of 1 to 6.

A graft polymer with a hydrocarbon group of the present aspect has, as described above, a structure obtained by graft polymerization of monomer components containing a predetermined hydrophilic monomer, onto a predetermined polyoxyalkylene-based compound containing a hydrocarbon group. Each of the components of a graft polymer of the present aspect will be explained below in detail. Note that a polymer of the present aspect may be any one as long as having a structure unit derived from a polyoxyalkylene-based compound, and a structure unit derived from monomer components containing a hydrophilic monomer having an anionic group or a hydroxyl group, and should not be limited by a production method (for example, by graft polymerization (addition polymerization), to be described later or the like) of the polymer.

[A Polyoxyalkylene-Based Compound]

A polyoxyalkylene-based compound is represented by the following formula (1):

(1)

In the above formula (1), R represents a straight chain or branched alkyl or alkenyl group; here carbon atoms, which R has, are 10 to 20, preferably 11 to 18, and more preferably 12 to 14. The carbon atoms, which R has, below 10 weaken interaction with a surfactant, which then could reduce deposition suppression capability. On the other hand, the carbon atoms, which R has, over 20 increase viscosity, resulting in difficulty in polymerization, or even when polymerization is attained, could make use as a detergent builder difficult. As the alkyl group, for example, includes decyl group, undecyl group, dodecyl group, tridecyl group, tetradecyl group, pentadecyl group, hexadecyl group, heptadecyl group, octadecyl group, nonadecyl group, icosyl group or the like. In addition, the alkenyl group includes, for example, decylene group, undecylene group, dodecylene group, tridecylene group, tetradecylene group, pentadecylene group, hexadecylene group, heptadecylene group, octadecylene group, nonadecylene group, icosylene group or the like. Among these, R is preferably dodecyl group, tridecyl group, tetradecyl group, dodecylene group, tridecylene group, or tetradecylene group; and dodecyl group, tridecyl group or tetradecyl group is more preferable. Note that, in view of providing relatively low viscosity and thus easy handling, R is preferably a secondary alkyl or alkenyl group.

In the above formula (1), X represents:

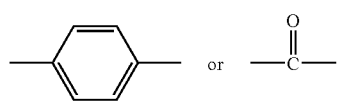

wherein p represents 0 or 1. Note that, a graft polymer of the present aspect preferably has no aromatic ring in a structure thereof; this is because, in the case where, a graft polymer of the present aspect is discharged into environment and the polymer is decomposed, the aromatic ring contained in the polymer may become species causing hazardous substances. Therefore, when p is 1 in the above formula (1), X is preferably a carbonyl group, however, p is preferably 0 (namely, X is not present).

In the above formula (1), Y represents any one of:

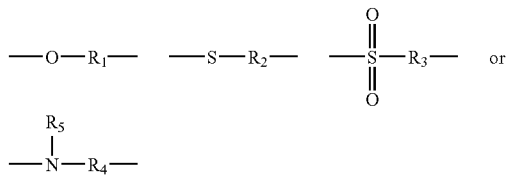

wherein $R_1$ to $R_4$ each independently represent an alkylene group of C2 to C6, preferably C2 to C4, more preferably C2 to C3, and most preferably C2. In addition, $R_5$ represents hydrogen atom, or a group represented by the following formula (2)

(2)

In the above formula (2), $R_6$ and $R_7$ each independently represent an alkylene group of C2 to C20, preferably C2 to C15, more preferably C2 to C10, further preferably C2 to C5, particularly preferably C2 to C3, and most preferably C2. In addition, represents an integer of 0 to 200, preferably 0 to 100, more preferably 0 to 70, and further preferably 0 to 55. Note that when s is equal to or larger than 2, $R_7$ may be present alone or as a mixture of 2 or more kinds. Here, in view of improvement of deposition suppression capability, Y is preferably —O—$R_1$—.

In the above formula (1), Z represents an oxyalkylene group. Here, carbon atoms, which Z has, are 2 to 20, preferably 2 to 15, more preferably 2 to 10, further preferably 2 to 5, particularly preferably 2 to 3, and most preferably 2. As the oxyalkylene group, for example, a group derived from a compound such as ethylene oxide (EO), propylene oxide (PO), isobutylene oxide, 1-butene oxide, 2-butene oxide, trimethylethylene oxide, tetramethylene oxide, tetramethylethylene oxide, butadiene monoxide, octylene oxide, styrene oxide, 1,1-diphenylethylene oxide or the like may be exemplified. Among these, Y is preferably a group derived from EO or PO (namely, an oxyethylene group or an oxypropylene group), and more preferably an oxyethylene group. Note that Z may be present alone or as a mixture of 2 or more kinds. In the above formula (1), q represents an integer of 17 to 200, preferably 18 to 150, more preferably 19 to 100, and further preferably 20 to 60. Too small q could provide difficulty in polymerization; in addition, could reduce deposition suppression capability with lowering of water-solubility of a polymer. On the other hand, too large q could increases viscosity, resulting in difficulty in polymerization, or even when polymerization is attained, could make use as a detergent builder difficult.

The group formed by the oxyalkylene group (namely, $Z_q$ in the above formula (1)) is preferably one mainly composed by an oxyethylene group (—O—$CH_2$—$CH_2$—). Here, "mainly composed by an oxyethylene group" represents, in the case where 2 or more kinds of oxyalkylene groups are present in a monomer, oxyethylene groups occupy half or more, in number of all oxyalkylene groups present. This composition provides excellent effect of smooth proceeding of polymerization in production, and in improvement of water solubility.

$Z_q$ in the above formula (1), when "mainly composed by an oxyethylene group" is expressed by % by mole of oxyethylene groups, in 100% by mole of total oxyalkylene groups, is preferably 50 to 100% by mole, more preferably equal to or higher than 60% by mole, further preferably equal to or higher than 70% by mole, particularly preferably equal to or higher than 80% by mole, and most preferably equal to or higher than 90% by mole. The content of the oxyethylene groups below 50% by moles could lower hydrophilic property of a group formed from the oxyalkylene group.

In the above formula (1), r represents an integer of 1 to 6. In the case where r is equal to or larger than 2, the polyoxyalkylene-based compound represented by the above formula (1) results in having a structure wherein each of the groups represented in parenthesis of the above formula (1) is bound to each of different carbon atoms of the above-described R (the predetermined alkyl or alkenyl group), and does not contain a repeated structure of the group represented in parenthesis of the above formula (1) as a repeating unit. In this case, the group represented in parenthesis of the above formula (1) may be the same or different each other. Note that r is preferably 1 to 4, more preferably 1 to 2, and most preferably 1.

Such a polyoxyalkylene-based compound may be, when a commercial product is available, one purchased as the commercial product, or may be one prepared for oneself. A method for preparation of a polyoxyalkylene-based compound for oneself includes, for example, a method for adducting the above-described alkylene oxide to alcohol, ester, amine, amide, thiol, sulfonic acid or the like, having a moiety of a hydrocarbon group of a polyoxyalkylene-based compound, using a method such as:

1) anionic polymerization using a basic catalyst such as strong alkali such as hydroxide or alkoxide of an alkaline metal, an alkyl amine or the like;
2) cationic polymerization using a metal and semimetal halide, a mineral acid, acetic acid or the like as a catalyst; and
3) coordination polymerization using a combination of an alkoxide of a metal such as aluminum, iron, or zinc or the like; an alkaline earth metal compound, Lewis acid or the like; is included. In addition, as commercially available products of a polyoxyalkylene-based compound, for example, "Softanol" (trade mark) M series, manufactured by Nippon Shokubai Co. Ltd is included.

[Monomer Components]

In a graft polymer of the present aspect, monomer components form a grafted chain onto carbon atoms of a polyoxyalkylene chain of the above-described polyoxyalkylene-based compound.

The monomer components contain a hydrophilic monomer. The hydrophilic monomer is a monomer having an anionic group or a hydroxyl group. Here, as the anionic group, for example, a carboxyl group, a sulfonic acid group, a phosphonic acid group or the like is included. Such a hydrophilic monomer is exemplified, for example, a monomer having a carboxyl group, such as (meth)acrylic acid, maleic acid, fumaric acid, itaconic acid, crotonic acid or the like; a monomer having sulfo group such as 2-acrylamide-2-methylpropane sulfonic acid, (meth)allyl sulfonic acid, vinyl sulfonic acid, 2-hydroxy-2-allyloxy-1-propane sulfonic acid, 2-hydroxy-3-butene sulfonic acid or the like; a monomer having a phosphonic acid group such as vinylphosphonic acid, (meth)allylphosphonic acid or the like; a monomer having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth) acrylate, α-hydroxymethylethyl (meth)acrylate or the like; or the like. Among these, in view of having high polymerization property, weak acidity and thus simple and convenient handling, the hydrophilic monomer is preferably one having a carboxyl group, more preferably (meth)acrylic acid, and further preferably acrylic acid. These hydrophilic monomers may be used alone or may be used in combination of 2 or more kinds.

Note that monomer components contain the above-described hydrophilic monomer, and as well, in the monomer components, in addition to the above-described hydrophilic monomer, other monomer copolymerizable with the hydrophilic monomer may be contained. The other monomers are not especially limited, and includes, for example, alkyl (meth)acrylates such as methyl (meth)acrylate, ethyl (meth) acrylate, butyl (meth)acrylate, cyclohexyl (meth)acrylate and the like, obtained by esterification of (meth)acrylic acid with C1 to C18 alcohol; monomers having an amide group such as (meth)acrylamide, dimethylacrylamide, isopropylacrylamide and the like; vinyl esters such as vinyl acetate and the like; alkenes such as ethylene, propylene and the like; aromatic vinyl monomers such as styrene, styrene sulfonic acid and the like; maleimide derivative such as maleimide, phenylmaleimide, cyclohexylmaleimide and the like; vinyl monomers having a nitrile group such as (meth)acrylonitrile and the like; vinyl monomers having an aldehyde group such as (meth)acrolein and the like; alkyl vinyl ethers such as methyl vinyl ether, ethyl vinyl ether, butyl vinyl ether; monomers having the other functional group such as vinyl chloride, vinylidene chloride, allyl alcohol, vinylpyrrolidone; or the like. Also these other monomers may be used alone or may be used in combination of 2 or more kinds. In addition, in the case where the monomer components contain other monomer, in addition to a hydrophilic monomer, in a graft chain composed by these monomer components, addition form of composition units derived from each of the monomer components is not especially limited, and for example, may be random-like addition, or block-like addition.

Note that ratio of a hydrophilic monomer occupying in the monomer components is not especially limited, however, in view of sufficient exertion of effect of a graft polymer of the present aspect, ratio of a hydrophilic monomer, relative to total amount of the monomer components, is preferably 80 to 100% by mole, more preferably 90 to 100% by mole, further preferably 95 to 100% by mole, and most preferably 100% by mole.

[A Graft Polymer with a Hydrocarbon Group]

As described above, a graft polymer of the present aspect has a structure made by graft polymerization of the monomer components containing a predetermined hydrophilic monomer, onto a predetermined polyoxyalkylene-based compound containing a hydrocarbon group.

Graft amount of the monomer components is not especially limited, and may be set as appropriate, in consideration of desired performance as a detergent builder, or production easiness. In particular, control of amount of a hydrophilic monomer contained in the monomer components is preferable. Preferably, mass ratio of units derived from the polyoxyalkylene-based compound, and units derived from the hydrophilic monomer, present in the polymer, is 99:1 to 60:40, as ratio of units derived from the polyoxyalkylene-based compound: units derived from the hydrophilic monomer, more preferably 99:1 to 70:30, further preferably 99:1 to 75:25, and particularly preferably 99:1 to 80:20. Too few amount of the units derived from a hydrophilic monomer (graft units) could lower water-solubility; on the other hand, too many amount of the units derived from a hydrophilic monomer (graft units) increases viscosity, and as well could raise a problem of increase in amount of an unreacted monomer which could commingle in production as impurities. Note that it is difficult to selectively graft a graft chain derived from a hydrophilic monomer, at a specified moiety of a polyoxyalkylene chain of a polyoxyalkylene-based compound; therefore, in calculation of the above-described mass ratio, "units derived from a hydrophilic monomer" represents total units of whole graft chains grafted onto a polyoxyalkylene chain.

Weight average molecular weight of a graft polymer with a hydrocarbon group of the present aspect may be set as appropriate, in consideration of desired performance as a detergent builder, therefore note specially limited, however, specifically, weight average molecular weight of a graft polymer with a hydrocarbon group of the present aspect is preferably 1,000 to 100,000, more preferably 1,500 to 50,000, further preferably 2,000 to 30,000, and particularly preferably 3,000 to 10,000. Too large value of this weight average molecular weight increases viscosity and could make handling troublesome; on the other hand, too small value of this weight average molecular weight reduces deposition suppression capability, and could not exert sufficient performance as a detergent builder. Note that as the value of weight average molecular weight of a graft polymer with a hydrocarbon group of the present aspect, value measured by a method described in Examples to be described later should be adopted.

In addition, a graft polymer with a hydrocarbon group of the present aspect, as described above, has an alkyl or alkenyl group having relatively many carbon atoms, as a hydrocarbon group, and thus the group exhibits hydrophobic property. On the other hand, for a graft polymer of the present aspect to exert excellent performance as a detergent builder, a certain level of hydrophilic property is required as well. Specifically, I value defined by the following expression 1:

(Expression 1)

I value=(amount of the oxyalkylene group occupying the polymer (% by mass))+(amount of a repeating unit derived from the hydrophilic monomer occupying the polymer (% by mass)) is preferably equal to or larger than 80, more preferably equal to or larger than 83, and further preferably equal to or larger than 86. Note that the upper limit of the I value is not especially limited, however, too large I value may, on the contrary, increase hydrophilic property too high, and could not exerts performance sufficient as a detergent builder. In view of such viewpoint, this I value is preferably equal to or smaller than 99, and more preferably equal to or smaller than 98. Note that as this I value, value calculated by an NMR method should be adopted.

A graft polymer with a hydrocarbon group of the present aspect, as described above, when used as a detergent builder, is capable of effectively suppressing deposition of a surfactant, and effectively preventing soil re-deposition, even in washing using high hardness water; namely has excellent deposition suppression capability, and prevention capability of soil re-deposition. Therefore, a graft polymer with a hydrocarbon group, of the present aspect, is preferable to be used as a detergent builder. In this case, specific embodiment of deposition suppression capability of a graft polymer with a hydrocarbon group, of the present aspect, is not especially limited, however, as suppression rate of deposition, it is preferably 50%, more preferably equal to or higher than 60%, further preferably equal to or higher than 70%, and particularly preferably equal to or higher than 80%. In addition, specific embodiment of prevention capability of soil re-deposition of a graft polymer with a hydrocarbon group, of the present aspect, is not especially limited, however, as prevention rate of soil re-deposition, it is preferably equal to or higher than 75%, more preferably equal to or higher than 78%, further preferably equal to or higher than 82%, and particularly preferably equal to or higher than 85%. Note that as the values of suppression rate of deposition, and prevention rate of soil re-deposition, values measured by a method described in Examples to be described later should be adopted.

(Production Method)

A production method for a graft polymer with a hydrocarbon group, of the present aspect, is not especially limited, and the production is possible by referring to conventionally known knowledge as appropriate. However, as described above, the present inventors have found that even by trying to obtain a graft polymer by emulsion polymerization as described in JP-A-59-62614, a component intended to graft not necessarily grafted completely to a polyglycol ether chain, and certain parts of polymers different from an objective polymer (for example, polyacrylic acid) were formed; and thus have carried out a graft polymerization reaction in a reaction system using only a small amount of a solvent, and have found that a desired graft polymer is surely obtained.

Therefore, the second aspect of the present invention provides a production method for graft polymer with a hydrocarbon group. Namely, the second aspect of the present invention is a method for producing a graft polymer with a hydrocarbon group, in a reaction system where content of a solvent is equal to or less than 10% by mass, relative to total amount of the reaction system, under temperature condition of equal to or higher than 100° C., having a step for graft polymerization of monomer components containing a hydrophilic monomer having an anionic group or a hydroxyl group, on a polyoxyalkylene-based compound represented by the following formula (1):

Note that specific embodiment and preferable embodiment of a polyoxyalkylene-based compound and monomer components are as described in the item of the first aspect of the present invention. Therefore, detailed explanation is omitted here. However, the scope of a graft polymer with a hydrocarbon group of the first aspect of the present invention should not be limited to only one produced by a production method of the second aspect of the present invention.

In a production method of the second aspect of the present invention, predetermined monomer components are polymerized onto a polyoxyalkylene-based compound represented by the above formula (1). In addition, a production method of the second aspect of the present invention is characterized by using, as a reaction system of this graft polymerization, a reaction system where content of a solvent is equal to or less than 10% by mass, relative to total amount of the reaction system; namely, in a production method of the second aspect of the present invention, graft polymerization is carried out substantially in a form of mass polymerization (bulk polymerization). Carrying out graft polymerization in such a form is capable of attaining efficient grafting of monomer components onto a polyoxyalkylene chain of a polyoxyalkylene-based compound, and thus providing excellent effect, as described above.

Specific embodiment of polymerization is not especially limited, and conventional knowledge on mass polymerization (bulk polymerization) may be referred to as appropriate, and further may be modified if necessary, to be adopted as a production method for the present embodiment.

In carrying out graft polymerization, firstly, a polyoxyalkylene-based compound to become a skeleton of a graft polymer, and monomer components to become branches of the graft polymer are prepared in each desired amount. In this case, amount of each of the components to be prepared is preferably adjusted so as to yield preferable composition ratio explained in the item of the first aspect of the present invention.

In addition, in carrying out graft polymerization, a known radical polymerization initiator may be used as a polymerization initiator. As the radical polymerization initiator, an organic peroxide may preferably be used. The organic peroxide includes, for example, ketone peroxides such as cyclohexanone peroxide, methyl ethyl ketone peroxide and the like; peroxy ketals such as 1,1-bis(tert-butylperoxy)cyclohexane, 2,2-bis(tert-butylperoxy)butane and the like; hydroperoxides such as diisopropylbenzene hydroperoxide, tert-hexyl hydroperoxide, tert-butyl hydroperoxide and the like; dialkyl peroxides such as 2,5-dimethyl-2,5-bis(tert-butylperoxy)hexane, di-tert-butyl peroxide and the like; diacyl peroxides such as isobutyryl peroxide, octanoyl peroxide, lauroyl peroxide, succinic acid peroxide, benzoyl peroxide and the like; peroxydicarbonates such as di-n-propyl peroxydicarbonate, di-isopropyl peroxydicarbonate, di-sec-butyl peroxydicarbonate and the like; peroxyesters such as tert-hexyl peroxyneodecanoate, tert-butyl peroxyneodecanoate, tert-butyl peroxy-2-ethylhexanoate, tert-butyl peroxyisobutyrate, tert-butylperoxymaleic acid, tert-butyl peroxylaurate, tert-butyl peroxyisopropyl monocarbonate, tert-butyl peroxyacetate, tert-butyl peroxybenzoate and the like; the other organic peroxide such as tert-butyl peroxyallyl carbonate, tert-butyl trimethylsilyl peroxide, acetylcyclohexylsulfonyl peroxide and the like; or the like. Among these, use of an initiator not having an aromatic ring is preferable; this is because, use of an initiator having an aromatic ring (for example, benzoyl peroxide) could generate hazardous benzene or the like. Note that, as the initiator, use of dialkyl peroxides is more preferable, and use of di-tert-butyl peroxide is particularly preferable. These organic peroxides may be used alone or may be used in combination of 2 or more kinds.

Use amount of the radical polymerization initiator used in graft polymerization is not especially limited, however, preferably 0.1 to 10% by mass, more preferably 0.5 to 8% by mass, and further preferably 1 to 6% by mass, relative to total amount of monomer components used in graft polymerization. Too few use amount of the radical polymerization initiator could lower graft rate of monomer components onto a polyoxyalkylene chain. On the other hand, too many use amount of the radical polymerization initiator is not capable of providing effect comparable to the increase in use amount, and could hike production cost. Note that the addition form of the radical polymerization initiator is not especially limited, however, the addition at the same time as the monomer components, and that in a state of not mixing with a polyoxyalkylene-based compound, in advance, is preferable. However, such an embodiment may also be adoptable as carrying out graft polymerization in the added state of the radical polymerization initiator, in advance, to a polyoxyalkylene-based compound, or at least one of the monomer components.

In carrying out graft polymerization, a decomposition catalyst of the radical polymerization initiator, or a reducing compound may be added into a reaction system, in addition to the above-described radical polymerization initiator. As the decomposition catalyst of the radical polymerization initiator, for example, a metal halide such as lithium chloride, lithium bromide or the like; a metal oxide such as titanium oxide, silicon dioxide or the like; a metal salt of inorganic acid such as hydrochloric acid, hydrobromic acid, perchloric acid, sulfuric acid, nitric acid or the like; a carboxylic acid such as formic acid, acetic acid, propionic acid, butyric acid, isobutyric acid, benzoic acid or the like, and an ester or a metal salt thereof; heterocyclic amine such as pyridine, indole, imidazole, carbazole and the like, and derivatives thereof; or the like is included. These decomposition catalysts may be used alone or may be used in combination of 2 or more kinds.

In addition, as the reducing compound, for example, an organic metal compound such as ferrocene or the like; an inorganic compound enabled to leave metallic ion such as iron, copper, nickel, cobalt manganese or the like, represented by iron naphthenate, copper naphthenate, nickel naphthenate, cobalt naphthenate, manganese naphthenate or the like; an inorganic compound such as boron trifluoride-etherate adduct, potassium permanganate, perchloric acid or the like; a sulfur containing compound represented by sulfur dioxide, sulfite, sulfate, bisulfite, thiosulfate, sulfoxylate, cyclic sulfinic acid analogue such as benzene sulfinic acid and substitution derivative thereof, p-toluene sulfinic acid or the like; a mercapto compound such as octylmercaptan, dodecyl mercaptan, mercaptoethanol, α-mercaptopropionic acid, thioglycolic acid, thiopropionic acid, α-thiopropionic acid sodiosulfopropyl ester, α-thiopropionic acid sodiosulfoethyl ester or the like; a nitrogen containing compound such as hydrazine, β-hydroxyethylhydrazine, hydroxylamine or the like; aldehydes such as formaldehyde, acetaldehyde, propionaldehyde, n-butylaldehyde, isobutylaldehyde, isovaleryl aldehyde and the like; ascorbic acid; or the like is included. These reducing compounds may also be used alone or may be used in combination of 2 or more kinds.

A production method of the second aspect of the present invention is characterized in that graft polymerization is carried out substantially in a form of mass polymerization (bulk polymerization). Specifically, a reaction system, where content of a solvent is equal to or less than 10% by mass relative to total amount of the reaction system, is used, as a reaction system of this graft polymerization. Carrying out graft polymerization in such a form is capable of attaining efficient grafting of monomer components onto a polyoxyalkylene chain of the polyoxyalkylene-based compound, and thus is capable of suppressing raising a problem such as reduction of builder performance caused by impurities derived from monomer components, as was a problem in a graft polymer obtained by a conventional emulsion polymerization or the like.

In a production method of the second aspect of the present invention, use amount of a solvent is equal to or less than 10% by mass relative to total amount of the reaction system, however, preferably equal to or less than 7% by mass, more preferably equal to or less than 5% by mass, further preferably equal to or less than 3% by mass, and most preferably substantially not containing a solvent. "Substantially not containing a solvent" represents an embodiment of not adding a solvent, in a positive way, in graft polymerization, and represents that commingling of a solvent in about impurity amount is allowable.

In the case where a solvent is contained in a reaction system, a solvent to be used is not especially limited, however, one having small chain transfer constant to a solvent of monomer components, or one having a boiling point of equal to or higher than 80° C., which enables use under normal pressure, is preferable. Such a solvent includes, for example, alcohols such as isobutyl alcohol, n-butyl alcohol, tert-butyl alcohol, ethylene glycol, diethylene glycol, triethylene glycol, propylene glycol, ethylene glycol monoalkyl ether, propylene glycol monoalkyl ether and the like; diethers such as ethylene glycol dialkyl ether, propylene glycol dialkyl ether and the like; acetic acid-based compounds such as acetic acid, ethyl acetate, propyl acetate, butyl acetate, ethylene glycol monoalkyl ether acetate, propylene glycol monoalkyl ether acetate and the like; or the like. These solvents may be used alone or may be used in combination of 2 or more kinds. As an alkyl group in the above alcohols and diethers, for example, methyl group, ethyl group, propyl group, butyl group or the like is included.

In a production method in the second aspect of the present invention, temperature in graft polymerization is equal to or higher than 100° C., preferably 100 to 160° C., and further preferably 110 to 150° C. Too low temperature in polymerization increases viscosity of a reaction solution too high, which could make proceeding of graft polymerization difficult, and reduce grafting rate of monomer components. On the other hand, too high temperature in polymerization could generate thermal decomposition of a polyoxyalkylene-based compound and the resulting graft polymer. Note that temperature in graft polymerization may not necessarily be maintained constant, always during a polymerization reaction, and for example, polymerization may be started at room temperature and then the temperature may be raised to set temperature by suitable temperature raising time or temperature raising speed, and may be maintained at the set temperature hereinafter; the temperature may be altered (increase or decrease) with time during a polymerization reaction, in accordance with a dropping method for the monomer components, the initiator, or the like.

Polymerization time is not especially limited, however, preferably 60 to 420 minutes, more preferably 90 to 390 minutes, and further preferably 120 to 360 minutes.

As pressure in a reaction system, any of under normal pressure (atmospheric pressure), under reduced pressure, or under pressurization may be included, however, it is preferable that polymerization is carried out under normal pressure or under pressurization in a closed reaction system, in view of molecular weight of the resultant copolymer. In addition, it is preferable that polymerization is carried out under normal pressure (atmospheric pressure), in view of facility such as pressurization equipment or depressurization equipment, a pressure-proofing reactor, piping or the like. Atmosphere in a reaction system may be air atmosphere, however, inert atmosphere is preferable; for example, purging inside the system with inert gas such as nitrogen or the like before the start of polymerization is preferable.

In graft polymerization, polymerization is preferably initiated in a state of charging, in a reaction system, a part of or whole of polyoxyalkylene-based compounds to become a skeleton of a graft polymer. For example, such an embodiment is exemplified as after charging whole of polyoxyalkylene-based compounds in a reaction system, and raising temperature of the reaction system, separately adding monomer components and a radical polymerization initiator, if necessary, to proceed graft polymerization. Such an embodiment is preferable because of being capable of easily adjusting molecular weight of the resulting graft polymer. Note that graft polymerization may be carried out in a batch system or a continuous system.

In a graft polymer with a hydrocarbon group, of the first aspect of the present invention, and a graft polymer with a hydrocarbon group produced by a production method of the second aspect of the present invention, monomer components are efficiently grafted onto a polyoxyalkylene chain of a polyoxyalkylene-based compound. A structure of a polymer with a graft rate of 100% is particularly preferable, and such an embodiment is capable of suppressing raising such a problem as residue of impurities (for example, polyacrylic acid) derived from monomer components not grafted, and reduction of builder performance accompanying therewith, as was a problem in a graft polymer obtained by a method such as conventional emulsion polymerization. To quantitatively express this effect, ratio value, $(h_1/h_2)$, of peak area derived from the hydrophilic monomer grafted $(h_1)$, and peak area derived from the hydrophilic monomer not grafted $(h_2)$, observed in analysis of the graft polymer with a hydrocarbon group, of the first aspect of the present invention, by an electrophoresis method, is equal to or larger than 1, more preferably equal to or larger than 4, and further preferably equal to or larger than 9. Note that, as the value of each of the peak areas, value measured by an electrophoresis method under the following conditions should be adopted.

<A Measurement Method for Peak Area by an Electrophoresis Method>

Apparatus name: CAPI3300 manufactured by Otsuka Electronics Co., Ltd.
Sample polymer concentration: 1.5% by mass
Electrophoresis solution: Aqueous solution of 0.05 M pyroborate
Electrophoresis condition: 25° C., 15 kV constant-voltage mode
Sample injection: Suction mode (50 kPa)
Sample injection time: 5 seconds
Detection wavelength: 210 nm
Capillary: Inner diameter of 75 μm×length of 60 cm
Measurement time: for 30 minutes A graft polymer of the first aspect of the present invention, and a graft polymer produced by a production method of the second aspect of the present invention, as described above, may be used as a detergent builder. A detergent builder may be used by adding into a detergent for various applications including for, clothing, tableware, housing, hair care, body, tooth paste, automobile and the like. As described above, a detergent composition containing a detergent builder composed by the above graft polymer is also a preferable aspect of the present invention. Therefore, the third aspect of the present invention provides also a detergent composition containing a graft polymer with a hydrocarbon group provided by the present invention.

A detergent composition of the third aspect of the present invention contains the above-described graft polymer with a hydrocarbon group, and content of the graft polymer with a hydrocarbon group, in a detergent composition, is not especially limited; however, in view of exerting excellent builder performance, the content of the graft polymer with a hydrocarbon group is preferably 0.1 to 15% by mass, more preferably 0.3 to 10% by mass, and further preferably 0.5 to 5% by mass, relative to total amount of the detergent composition.

In the detergent composition of the third aspect of the present invention, surfactants or additives usually used in a detergent may be contained. Specific embodiment of these surfactants or additives is not especially limited, and conventionally known knowledge in a detergent field may be referred to as appropriate. In addition, the detergent composition of the third aspect of the present invention may be a powder detergent composition, or may be a liquid detergent composition.

The surfactant is 1 kind or 2 or more kinds selected from the group consisting of an anionic surfactant, a nonionic surfactant, a cationic surfactant, and an amphoteric surfactant. In the case where 2 or more kinds are used in combination, total use amount of the anionic surfactant and the nonionic surfactant is preferably equal to or more than 50% by mass, more preferably equal to or more than 60% by mass, further preferably equal to or more than 70% by mass, and particularly preferably equal to or more than 80% by mass, relative to total amount of the surfactants.

The anionic surfactant suitably includes an alkylbenzene sulfonate, an alkylether sulfate, an alkenylether sulfate, an alkyl sulfate, an alkenyl sulfate, an $\alpha$-olefin sulfonate, an $\alpha$-sulfo aliphatic acid or an ester salt thereof, an alkane sulfonate, a saturated aliphatic acid salt, an unsaturated aliphatic acid salt, an alkylether carboxylate, an alkenylether carboxylate, an amino acid-based surfactant, an N-acylamino acid-based surfactant, an alkyl phosphate or a salt thereof, or an alkenyl phosphate or a salt thereof. In an alkyl group or an alkenyl group in these anionic surfactants, an alkyl group like a methyl group may be branched.

The nonionic surfactant suitably includes a polyoxyalkylene alkyl ether, a polyoxyalkylene alkenyl ether, a polyoxyethylene alkylphenyl ether, a higher aliphatic acid alkanolamide or an alkyleneoxide adduct thereof, an aliphatic acid ester of sucrose, an alkyl glycoside, an aliphatic acid monoester of glycerin, an alkylamine oxide or the like. In an alkyl group or an alkenyl group in these nonionic surfactants, an alkyl group like a methyl group may be branched.

The cationic surfactant suitably includes a quaternary ammonium salt or the like. In addition, the amphoteric surfactant suitably includes a carboxyl-based amphoteric surfactant, or a sulfobetaine-based amphoteric surfactant. In an alkyl group or an alkenyl group in these cationic surfactants or amphoteric surfactants, an alkyl group like a methyl group may be branched.

Usually, formulation ratio of the above-described surfactants is preferably 10 to 60% by mass, more preferably 15 to 50% by mass, further preferably 20 to 45% by mass, and particularly preferably 25 to 40% by mass, relative to total amount of the detergent composition. Too low formulation ratio of the surfactant could not exert sufficient cleaning capability, while too high formulation ratio could lower economic performance.

As the additives, a re-deposition preventive agent to prevent re-deposition of soil such as an alkaline builder, a chelate builder, sodium carboxymethylcellulose; a soil suppressing agent such as benzotriazole, or ethylene thiourea; a soil releasing agent, an inhibitor of color transferring, a softening agent, an alkaline material for pH adjustment, a flavor, a solubilizing agent, a fluorescent agent, a coloring agent, a foaming agent, a foam stabilizer, a glazing agent, a sterilizer, a bleaching agent, a bleaching auxiliary agent, an enzyme, a dye, a solvent and the like are suitable. In addition, in the case of a powder type detergent composition, formulation of zeolite is preferable.

A detergent composition of the third aspect of the present invention may contain other detergent builders in addition to a graft polymer with a hydrocarbon group of the present invention. Other detergent builders is not especially limited, and include, for example, alkali builder such as carbonate, hydrogen carbonate, silicate and the like; or chelate builders such as a tripolyphosphate salt, a pyrophosphate salt, Glauber's salt, a nitrilotriacetate salt, an ethylene diamine tetraacetate salt, a citrate salt, a copolymer salt of (meth)acrylic acid, a copolymer of acrylic acid and maleic acid, a fumarate salt, zeolite or the like; carboxyl derivatives of polysaccharides such as carboxymethylcellulose and the like. A counter salt used in the above builders includes alkali metals such as sodium, potassium and the like, ammonium, amine or the like.

Formulation ratio of the above additives/other detergent builders is usually preferably 0.1 to 20% by mass, more preferably 0.2 to 15% by mass, further preferably 0.3 to 10% by mass, particularly preferably 0.4 to 8% by mass, and most preferably 0.5 to 5% by mass, relative to 100% by amount of a detergent composition. Formulation ratio of the above additives/other detergent builders below 0.1% by mass could not sufficiently exert detergent performance, while the ratio over 20% by mass could reduce economic performance.

Formulation form of a graft polymer with a hydrocarbon group, contained in a detergent composition of the third aspect of the present invention, may be any of liquid-like, solid-like or the like, and may be determined in response to a form of a detergent in sale (for example, a liquid substance or a solid substance).

Note that, concept of a detergent composition of the third aspect of the present invention includes not only a synthesis detergent for domestic use, a detergent for other industrial use like in fiber industry or the like, a detergent for hard surface but also a detergent used only in a specific application like a detergent for bleaching with one enhanced action of the component.

In the case where a detergent composition of the third aspect of the present invention is a liquid type detergent composition, amount of water contained in the liquid detergent composition is usually preferably 0.1 to 75% by mass, more preferably 0.2 to 70% by mass, further preferably 0.5 to 65% by mass, further more preferably 0.7 to 60% by mass, particularly preferably 1 to 55% by mass, and most preferably 1.5 to 50% by mass, relative to total amount of the liquid type detergent composition.

In the case where a detergent composition of the third aspect of the present invention is a liquid type detergent composition, the detergent composition preferably has a kaolin turbidity of equal to or smaller than 200 mg/L, more preferably equal to or smaller than 150 mg/L, further preferably equal to or smaller than 120 mg/L, particularly preferably equal to or smaller than 100 mg/L, and most preferably equal to or smaller than 50 mg/L.

In addition, change (difference) in kaolin turbidity between the case where a graft polymer with a hydrocarbon group provided by the present invention is added to a liquid detergent composition as a detergent builder, and the case of not added, is preferably equal to or smaller than 500 mg/L, more preferably equal to or smaller than 400 mg/L, further preferably equal to or smaller than 300 mg/L, particularly preferably equal to or smaller than 200 mg/L, and most preferably equal to or smaller than 100 mg/L. As the value of kaolin turbidity, value measured by the following method should be adopted.

<A Measurement Method for Kaolin Turbidity>

A uniformly stirred sample (a liquid detergent) is charged in a 50-mm square cell having a thickness of 10 mm, and after removing air bubbles, turbidity (kaolin turbidity: mg/L) is measured at 25° C. using NDH2000 (tradename, a turbidity meter) manufactured by Nippon Denshoku Ind. Co., Ltd.

As an enzyme, which can be formulated into the above detergent composition, protease, lipase, alkali lipase, cellulase or the like are preferable.

Addition amount of the enzyme is preferably equal to or less than 5% by mass relative to 100% by amount of the detergent composition. The addition amount over 5% by mass does not provide improvement effect of washing capability, and thus could reduce economic performance.

A detergent composition of the third aspect of the present invention has excellent washing effect without salt deposition, even when used in hard water having high concentration of calcium ions or magnesium ions. Namely, a fourth aspect of the present invention is a washing method using the detergent composition of the third aspect of the present invention, and water having a hardness of equal to or higher than 100 mg/L (converted to calcium carbonate). It is as described above that a linear chained alkylbenzene sulfonate salt (LAS) such as a dodecylbenzene sulfonate salt, and calcium ions or magnesium ions, contained in water used in washing, form a salt, and this salt suppresses washing effect of LAS. This raises a particular problem in a region where calcium concentration contained in water is high, specifically, in a region where hardness of water is equal to or larger than 100 mg/L. On the other hand, washing using a detergent composition of the third aspect of the present invention is capable of solving such a problem. This effect is particularly apparent in the case where a detergent composition of the third aspect of the present invention contains an anionic surfactant such as LAS.

In a washing method of the fourth aspect of the present invention, the above detergent composition of the third aspect of the present invention is used. Amount of a detergent composition used in washing is not especially limited, as long as the effect of the present invention can be obtained, however, usually, a detergent composition is used in an amount of 0.3 to 3.0 g/L in washing water. Use amount within this range is preferable in view of washing performance or solubility of a detergent.

Water used in washing in a washing method of the fourth aspect of the present invention is one having a hardness of equal to or higher than 100 mg/L (converted to calcium carbonate), however, more preferably a hardness of 100 to 500 mg/L, and further preferably a hardness of 100 to 300 mg/L, converted to calcium carbonate. Note that "hardness" referred to in the present invention represents total hardness measured in accordance with JIS K0101.

In a washing method of the fourth aspect of the present invention, specific embodiment such as a washing apparatus (a washing machine, hand washing or the like) or washing times is not especially limited, as long as washing is carried out using a detergent composition of the third aspect of the present invention, and water with a hardness of equal to or higher than 100 mg/L.

EXAMPLES

The present invention will be explained in more detail with reference to Examples, however, the present invention is by no means limited only to these Examples. Note that "parts" represents "parts by mass", and "%" represents "% by mass", unless otherwise specified.

In addition, weight average molecular weight, deposition suppression capability, and prevention capability of soil re-deposition of a graft polymer with a hydrocarbon group, prepared in the present Examples, were measured according to the following methods:
<Measurement Conditions of Weight Average Molecular Weight>
Equipment: L-7000 series manufactured by Hitachi Ltd.
Detector: RI
Column: SHODEX Asahipak GF-310-HQ, GF-710-HQ, and GF-1G 7B manufactured by Showa Denko K. K.
Column temperature: 40° C.
Flow rate: 0.5 ml/min
Calibration curve: POLYETHYLENE GLYCOL STANDARD manufactured by Souwa Science Co., Ltd.
Eluting solution: 0.1N sodium acetate/acetonitrile=3/1 (mass ratio)

<Measurement Method for Deposition Suppression Capability>
(1) In water (pH=10) containing 200 mg/L of sodium dodecylbenzenesulfonate, and 10 mg/L of a sample polymer, an aqueous solution of calcium chloride was added so as to be a hardness of 610 mg/L, as calcium carbonate concentration.
(2) Into 14.7 g of calcium chloride dihydrate, deionized water was added so as to make 100 g in total to prepare an aqueous solution of 1 mol/L calcium chloride.
(3) Into 4.5 g of glycine and 3.5 g of sodium chloride, deionized water was added so as to make 1,000 g in total to prepare a glycine buffer solution. Note that pH was adjusted to 10 by sodium hydroxide.
(4) Into 2.0 g of sodium dodecylbenzenesulfonate, 0.1 g of the sample polymer was added, and further added deionized water thereto so as to make 200 g in total to prepare a test solution.
(5) Into 3.6 g of the glycine buffer solution prepared in (3), and 1.8 g of the test solution prepared in (4), deionized water was added so as to make 90 g in total to prepare a sample solution by sufficient stirring using a magnetic stirrer.
(6) After titration of the sample solution prepared in (5) with the aqueous solution of 1 mol/L calcium chloride, using an automatic titration apparatus manufactured by Hiranuma Sangyo Co., Ltd. (Main unit: COM-550, brightness speed unit: M-500), transmittance of the sample solution was measured (wavelength: 650 nm). Note that titration amount of the aqueous solution of calcium chloride was 0.55 ml, and titration speed was 0.025 ml/s.
(7) From the above measurement result, transmittance of the sample solution, at the time when 0.55 ml of the aqueous solution of calcium chloride was added, was measured, and the value was used as suppression rate of deposition. Note that higher suppression rate of deposition indicates to be more excellent in deposition suppression capability.

<Measurement Method for Prevention Rate of Soil Re-Deposition>
(1) White cloth was prepared by cutting out polyester cloth purchased from Test Fabric Co., Ltd. to a 5 cm×5 cm size. Degree of whiteness as reflection rate of this white cloth was measured in advance using the calorimetric color difference meter SE2000 model manufactured by Nippon Denshoku Ind. Co., Ltd.
(2) Hard water was prepared by adding deionized water to 4.41 g of calcium chloride dihydrate so as to make 15 kg in total.
(3) An aqueous solution of a surfactant was prepared by adding deionized water to 4.0 g of sodium dodecylbenzene sulfonate, 6.0 g of sodium carbonate and 2.0 g of sodium sulfate so as to make 15 kg in total.
(4) "Targot meter" was set at 25° C.; 1 L of hard water, 5 g of the aqueous solution of the surfactant, 1 g of an aqueous solution of a polymer, with a solid content of 2%, 0.15 g of zeolite and 0.25 g of carbon black were charged in a pot and stirred for 1 minute at 100 rpm. Subsequently, 10 pieces of the white cloth were stirred therein for 10 minutes at 100 rpm.
(5) Water rinsing from the cloth by hand, and then putting the cloth into the pot containing 1 L of tapped water at 25° C. and subsequent stirring for 2 minutes at 100 rpm were repeated twice.
(6) After wrinkles on the cloth were stretched with an iron by covering with another cloth, and the cloth was dried, degree of whiteness of the white cloth was measured again as reflection rate, by the above-described color and color difference meter.
(7) Prevention rate of soil re-deposition was determined by the following expression (2) using the above measurement results. Note that higher prevention rate of soil re-deposition indicates more excellent prevention capability of soil re-deposition.

Prevention rate of soil re-deposition(%)=[(degree of whiteness after cleaning)/(degree of whiteness of original cloth)]×100                    [Expression 2]

Example 1-1

Into a 500-mL glass separable-flask equipped with a refluxing condenser and a stirrer, 181.3 g of "Softanol 500" (50-mole of ethylene oxide adduct to the secondary alcohol (C12 to C14) manufactured by Nippon Shokubai Co., Ltd.) was charged and heated up to 126° C. under nitrogen blowing and stirring to prepare a polymerization reaction system. Then, into the polymerization reaction system maintained at 126° C., under stirring, 32.0 g of 100% acrylic acid (hereafter may be referred to as "AA") and 1.6 g of di-tert-butyl peroxide (hereinafter may be referred to as "DTBP") were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 92.1 g of deionized water was added to dilute the polymerization reaction solution.

By the above procedure, an aqueous solution with a solid content of 70%, of the polymer 1, having a weight average molecular weight of 5,800, was obtained.

Example 1-2

Into a 500-mL glass separable-flask equipped with a refluxing condenser and a stirrer, 74.7 g of "Softanol 300" (30-mole of ethylene oxide adducted to the secondary alcohol (C12 to C14) manufactured by Nippon Shokubai Co., Ltd.) was charged and heated up to 126° C. under nitrogen blowing and stirring to prepare a polymerization reaction system. Then, into the polymerization reaction system maintained at 126° C., under stirring, 32.0 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 46.4 g of deionized water was added to dilute the polymerization reaction solution.

By the above procedure, an aqueous solution with a solid content of 70%, of the polymer 2, having a weight average molecular weight of 4,700 was obtained.

Example 1-3

Into a 500-mL glass separable-flask equipped with a refluxing condenser and a stirrer, 181.3 g of "Softanol 300" was charged and heated up to 126° C. under nitrogen blowing and stirring to prepare a polymerization reaction system. Then, into the polymerization reaction system maintained at 126° C., under stirring, 32.0 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 92.1 g of deionized water was added to dilute the polymerization reaction solution.

By the above procedure, an aqueous solution with a solid content of 70%, of the polymer 3, having a weight average molecular weight of 4,400 was obtained.

Example 1-4

Into a 500-mL glass separable-flask equipped with a refluxing condenser and a stirrer, 74.7 g of "Softanol 200" (20-mole of ethylene oxide adduct to the secondary alcohol (C12 to C14) manufactured by Nippon Shokubai Co., Ltd.) was charged and heated up to 126° C. under nitrogen blowing and stirring to prepare a polymerization reaction system. Then, into the polymerization reaction system maintained at 126° C., under stirring, 32.0 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 46.4 g of deionized water was added to dilute the polymerization reaction solution.

By the above procedure, an aqueous solution with a solid content of 70%, of the polymer 4, having a weight average molecular weight of 4,700 was obtained.

Example 1-5

Into a 500-mL glass separable-flask equipped with a refluxing condenser and a stirrer, 152.0 g of "Softanol 600" (60-mole of ethylene oxide adducted to the secondary alcohol (C12 to C14) manufactured by Nippon Shokubai Co., Ltd.) was charged and heated up to 126° C. under nitrogen blowing and stirring to prepare a polymerization reaction system. Then, into the polymerization reaction system maintained at 126° C., under stirring, 8.0 g of AA and 0.4 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 68.7 g of deionized water was added to dilute the polymerization reaction solution.

By the above procedure, an aqueous solution with a solid content of 70%, of the polymer 5, having a weight average molecular weight of 5,100 was obtained.

Example 1-6

Into a 500-mL glass separable-flask equipped with a refluxing condenser and a stirrer, 181.3 g of 23-mole of ethylene oxide adduct to lauryl alcohol (hereafter may be referred to as "LA23") was charged and heated up to 126° C. under nitrogen blowing and stirring to prepare a polymerization reaction system. Then, into the polymerization reaction system maintained at 126° C., under stirring, 32.0 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 92.1 g of deionized water was added to dilute the polymerization reaction solution.

By the above procedure, an aqueous solution with a solid content of 70%, of the polymer 6, having a weight average molecular weight of 5,200 was obtained.

Example 1-7

Into a 500-mL glass separable-flask equipped with a refluxing condenser and a stirrer, 96.0 g of "Softanol 300" was charged and heated up to 76° C. under nitrogen blowing and stirring to prepare a polymerization reaction system. Then, into the polymerization reaction system maintained at 76° C., under stirring, 32.0 g of AA and 1.6 g of benzoyl peroxide (hereafter may be referred to as "BZP") were each dropped from a separate nozzle. Dropping period of each of the solutions was 200 minutes for BZP, and 210 minutes for AA, after 20 minutes of dropping start of BZP. Dropping speed of each of the solutions was kept constant, and dropping of each of the solutions was continuous.

After completion of the dropping of AA, the above-described reaction solution was maintained at 76° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the polymer 7, having a weight average molecular weight of 8,300 was obtained.

Example 1-8

Into a 500-mL glass separable-flask equipped with a refluxing condenser and a stirrer, 96.0 g of "Softanol 300" and 6.4 g of maleic acid were charged and heated up to 126° C. under nitrogen blowing and stirring to prepare a polymerization reaction system. Then, into the polymerization reaction system maintained at 126° C., under stirring, 25.6 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the polymer 8, having a weight average molecular weight of 8,800 was obtained.

Example 1-9

Into a 500-mL glass separable-flask equipped with a refluxing condenser and a stirrer, 96.0 g of "Softanol 300" and 6.4 g of itaconic acid were charged and heated up to 126° C. under nitrogen blowing and stirring to prepare a polymerization reaction system. Then, into the polymerization reaction system maintained at 126° C., under stirring, 25.6 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the polymer 9, having a weight average molecular weight of 6,200 was obtained.

Example 1-10

Into a 500-mL glass separable-flask equipped with a refluxing condenser and a stirrer, 96.0 g of "Softanol 300" was charged and heated up to 126° C. under nitrogen blowing and stirring to prepare a polymerization reaction system. Then, into the polymerization reaction system maintained at 126° C., under stirring, 25.6 g of AA, 6.4 g of 2-hydroxyethyl methacrylate (hereafter may be referred to as "HEMA"), and 1.6 g of DTBP were each dropped from a separate nozzle. Dropping period of each of the solutions was 200 minutes for DTBP, 210 minutes for AA, after 20 minutes of dropping start of DTBP, and 190 minutes for HEMA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the polymer 10, having a weight average molecular weight of 6,600 was obtained.

Example 1-11

Into a 500-mL glass separable-flask equipped with a refluxing condenser and a stirrer, 96.0 g of "Softanol 300"

was charged and heated up to 126° C. under nitrogen blowing and stirring to prepare a polymerization reaction system. Then, into the polymerization reaction system maintained at 126° C., under stirring, a mixture solution of 25.6 g of AA and 6.4 g of 2-acrylamide-2-methylpropanesulfonic acid (hereafter may be referred to as "AMPS"), and 1.6 g of DTBP were each dropped from a separate nozzle. Dropping period of each of the solutions was 200 minutes for DTBP, 210 minutes for AA, after 20 minutes of dropping start of DTBP, and 190 minutes for AMPS, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the polymer 11, having a weight average molecular weight of 8,600 was obtained.

Comparative Example 1

Into a 500-mL glass separable-flask equipped with a refluxing condenser and a stirrer, 96.0 g of 20-mole of ethylene oxide adduct to phenol (hereafter may be referred to as "PH20"), and 6.4 g of maleic acid were charged and heated up to 126° C. under nitrogen blowing and stirring to prepare a polymerization reaction system. Then, into the polymerization reaction system maintained at 126° C., under stirring, 25.6 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 55.5 g of deionized water was added to dilute the polymerization reaction solution.

By the above procedure, an aqueous solution with a solid content of 70%, of the comparative polymer 1, having a weight average molecular weight of 8,400 was obtained.

Comparative Example 2

Into a 500-mL glass separable-flask equipped with a refluxing condenser and a stirrer, 74.7 g of 10-mole of ethylene oxide adduct to methanol (hereafter may be referred to as "ME10"), and 10.7 g of maleic acid were charged and heated up to 126° C. under nitrogen blowing and stirring to prepare a polymerization reaction system. Then, into the polymerization reaction system maintained at 126° C., under stirring, 21.3 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 46.4 g of deionized water was added to dilute the polymerization reaction solution.

By the above procedure, an aqueous solution with a solid content of 70%, of the comparative polymer 2, having a weight average molecular weight of 6,300 was obtained.

Comparative Example 3

Into a 500-mL glass separable-flask equipped with a refluxing condenser and a stirrer, 74.7 g of 25-mole of ethylene oxide adduct to methanol (hereafter may be referred to as "ME25") was charged and heated up to 126° C. under nitrogen blowing and stirring to prepare a polymerization reaction system. Then, into the polymerization reaction system maintained at 126° C., under stirring, 32.0 g of AA and 1.6 g of DTBP were each dropped from a separate nozzle. Dropping period of each of the solutions was 200 minutes for DTBP, and 210 minutes for AA, after 20 minutes of dropping start of DTBP. Dropping speed of each of the solutions was kept constant, and dropping of each of the solutions was continuous.

After completion of the dropping of AA, the above-described reaction solution was maintained at 126° C. (aging) for further 60 minutes to complete polymerization. After completion of polymerization, the polymerization reaction solution was gradually cooled, under stirring, and 46.4 g of deionized water was added to dilute the polymerization reaction solution.

By the above procedure, an aqueous solution with a solid content of 70%, of the comparative polymer 3, having a weight average molecular weight of 9,500, was obtained.

Compositions of the resulting polymers in the above Examples 1-1 to 1-11, and Comparative Examples 1 to 3 are shown in Table 1

TABLE 1

|  | POA | Hydrophilic Monomer | Initiator (degree C.) | C | EO | Mw | POA/M | I Value |
|---|---|---|---|---|---|---|---|---|
| Polymer 1 | SFT500 | AA | DTBP(126) | 12-14 | 50 | 5,800 | 85/16 | 93 |
| Polymer 2 | SFT300 | AA | DTBP(126) | 12-14 | 30 | 4,700 | 70/30 | 91 |
| Polymer 3 | SFT300 | AA | DTBP(126) | 12-14 | 30 | 4,400 | 85/15 | 89 |
| Polymer 4 | SFT200 | AA | DTBP(126) | 12-14 | 20 | 4,700 | 70/30 | 87 |
| Polymer 5 | SFT600 | AA | DTBP(126) | 12-14 | 60 | 5,100 | 95/5 | 93 |
| Polymer 6 | LA23 | AA | DTBP(126) | 12 | 23 | 5,200 | 85/15 | 88 |
| Polymer 7 | SFT300 | AA | BZP(76) | 12-14 | 30 | 8,300 | 75/25 | 90 |
| Polymer 8 | SFT300 | AA/MA | DTBP(126) | 12-14 | 30 | 8,800 | 75/20/5 | 90 |
| Polymer 9 | SFT300 | AA/IA | DTBP(126) | 12-14 | 30 | 6,200 | 75/20/5 | 90 |

TABLE 1-continued

| | POA | Hydrophilic Monomer | Initiator (degree C.) | C | EO | Mw | POA/M | I Value |
|---|---|---|---|---|---|---|---|---|
| Polymer 10 | SFT300 | AA/HEMA | DTBP(126) | 12-14 | 30 | 6,600 | 75/20/5 | 90 |
| Polymer 11 | SFT300 | AA/AMPS | DTBP(126) | 12-14 | 30 | 8,600 | 75/20/5 | 90 |
| Comp. Polymer 1 | PH20 | AA/MA | DTBP(126) | 6 | 20 | 8,400 | 75/20/5 | 93 |
| Comp. Polymer 2 | ME10 | AA/MA | DTBP(126) | 1 | 10 | 6,300 | 70/20/10 | 98 |
| Comp. Polymer 3 | ME25 | AA | DTBP(126) | 1 | 25 | 9,500 | 70/30 | 99 |

Comp. Polymer: Comparative Polymer
POA: polyoxyalkylene-based compound
SFT: "Softanol" (trade mark of Nippon Shokubai Co. Ltd.)
MA: maleic acid
IA: itaconic acid
C: number of carbon atoms of a hydrocarbon group in a polyoxyalkylene-based compound
EO: mole numbers of ethylene oxide adducted to a polyoxyalkylene-based compound
Mw: weight-average molecular weight
PAG/M: mass ratio of the units derived from the polyoxyalkylene-based compound and the units derived from the hydrophilic monomer Example 2

In Example 2, to evaluate the resulting polymers in the above Examples 1-1 to 1-11, and Comparative Examples 1 to 3, as detergent compositions, deposition suppression capability and prevention capability of soil re-deposition were evaluated in accordance with the above-described methods. The results are shown in the following Table 2. Note that, in Table 2, result on a similar experiment carried out without the addition of a polymer is also shown, as a reference (in a column "No polymer addition" in Table 2).

TABLE 2

| | Deposition suppression capability (%) | Prevention rate of soil redeposition (%) |
|---|---|---|
| Polymer 1 | 86 | 88.8 |
| Polymer 2 | 89 | 91.5 |
| Polymer 3 | 85 | 87.2 |
| Polymer 4 | 85 | 87.2 |
| Polymer 5 | 86 | 89.4 |
| Polymer 6 | 85 | 85.5 |
| Polymer 7 | 85 | 86.9 |
| Polymer 8 | 83 | 88.3 |
| Polymer 9 | 84 | 87.8 |
| Polymer 10 | 82 | 85.6 |
| Polymer 11 | 86 | 87.7 |
| Comp. Polymer 1 | 26 | 72.6 |
| Comp. Polymer 2 | 45 | 70.9 |
| Comp. Polymer 3 | 29 | 74.5 |
| No Polymer addition | 49 | 61.1 |

Comp. Polymer: Comparative Polymer

Results in Table 2 show that a graft polymer with a hydrocarbon group provided by the present invention has significantly excellent deposition suppression capability and prevention capability of soil re-deposition, as compared with the case where a polymer was not added or the case where a conventional graft polymer was added. Therefore, use of a graft polymer with a hydrocarbon group provided by the present invention, as a detergent builder, is expected to effectively suppress deposition of a surfactant, and effectively suppress soil re-deposition, even when washing is carried out using high harness water.

The present application is based on JP application No. 2006-83817 filed on Mar. 24, 2006, whose disclosed content is incorporated herein by reference in its entirety.

The invention claimed is:

1. A graft polymer with a hydrocarbon group made by graft polymerization of monomer components containing a hydrophilic monomer having an anionic group or a hydroxyl group, on a polyoxyalkylene-based compound represented by the following formula (1):

wherein R represents a straight chain or branched C12 to C14 alkyl or alkenyl group; X represents:

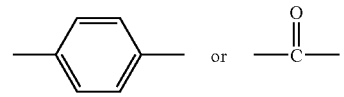

p represents 0 or 1; Y represents:

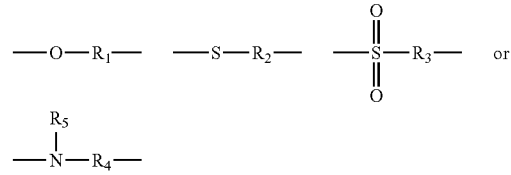

wherein $R_1$ to $R_4$ represent a C2 to C6 alkylene group; $R_5$ represents a hydrogen atom, or a group represented by the following formula (2):

wherein $R_6$ and $R_7$ represent a C2 to C20 alkylene group; s represents an integer of 0 to 200;
Z represents a C2 to C20 oxyalkylene group; q represents an integer of 17 to 200; the amount of oxyethylene group in $Z_q$ in the formula (1) is 50 to 100% by mole relative to 100% by mole of total oxyalkylene groups; and r represents an integer of 1 to 6,
wherein mass ratio of units derived from the polyoxyalkylene-based compound and units derived from the hydrophilic monomer, present in the polymer, is 99:1 to 60:40 units derived from the polyoxyalkylene-based compound:units derived from the hydrophilic monomer.

2. The graft polymer with a hydrocarbon group according to claim 1, wherein I value defined by the following expression 1 is equal to or larger than 80:

I value=amount of the oxyalkylene group occupying the polymer (% by mass)+amount of a repeating unit derived from the hydrophilic monomer occupying the polymer (% by mass). (Expression 1)

3. The graft polymer with a hydrocarbon group according to claim 1, wherein an aromatic ring is not included in a structure of the graft polymer.

4. The graft polymer with a hydrocarbon group according to claim 1, which is used as a detergent builder.

5. The graft polymer with a hydrocarbon group according to claim 4, wherein suppression rate of deposition is equal to or higher than 50%.

6. The graft polymer with a hydrocarbon group according to claim 4, wherein prevention rate of soil re-deposition is equal to or higher than 75%.

7. A detergent composition comprising the graft polymer with a hydrocarbon group according to claim 4.

8. A method for producing the graft polymer with a hydrocarbon group according to claim 1, in a reaction system where content of a solvent is equal to or less than 10% by mass, relative to total amount of the reaction system, under temperature condition of equal to or higher than 100° C., comprising a step for graft polymerization of monomer components containing a hydrophilic monomer having an anionic group or a hydroxyl group, on a polyoxyalkylene-based compound represented by the following formula (1):

(1)

wherein R represents a straight chain or branched C10 to C20 alkyl or alkenyl group; X represents:

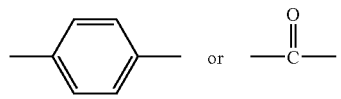

p represents 0 or 1; Y represents:

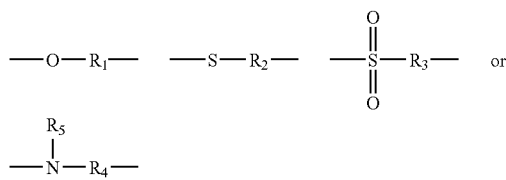

wherein $R_1$ to $R_4$ represent a C2 to C6 alkylene group; $R_5$ represents a hydrogen atom or a group represented by the following formula (2):

(2)

wherein $R_6$ and $R_7$ represent a C2 to C20 alkylene group; s represents an integer of 0 to 200;

Z represents a C2 to C20 oxyalkylene group; q represents an integer of 17 to 200; and r represents an integer of 1 to 6.

9. The graft polymer with a hydrocarbon group according to claim 1, wherein the graft polymer is produced by a method, in a reaction system where content of a solvent is equal to or less than 10% by mass, relative to total amount of the reaction system, under temperature condition of equal to or higher than 100° C., comprising a step for graft polymerization of monomer components containing a hydrophilic monomer having an anionic group or a hydroxyl group, on a polyoxyalkylene-based compound represented by the following formula (1):

(1)

wherein R represents a straight chain or branched C12 to C14 alkyl or alkenyl group; X represents:

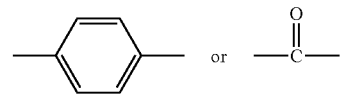

p represents 0 or 1; Y represents:

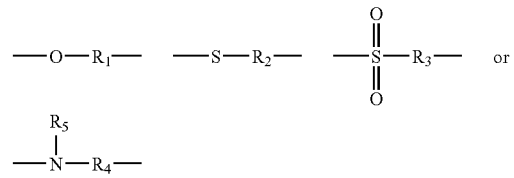

wherein $R_1$ to $R_4$ represent a C2 to C6 alkylene group; $R_5$ represents a hydrogen atom or a group represented by the following formula (2):

(2)

wherein $R_6$ and $R_7$ represent a C2 to C20 alkylene group; s represents an integer of 0 to 200;

Z represents a C2 to C20 oxyalkylene group; q represents an integer of 17 to 200; and r represents an integer of 1 to 6, wherein ratio value, ($h_1/h_2$), of peak area derived from the hydrophilic monomer grafted ($h_1$), and peak area derived from the hydrophilic monomer not grafted ($h_2$), observed in analysis of the graft polymer by an electrophoresis method, is equal to or larger than 1.

10. A washing method comprising washing with the detergent composition according to claim 7, and water having a hardness of equal to or higher than 100 mg/L (converted to calcium carbonate).

11. A washing method comprising washing with the detergent composition containing the graft polymer with a hydrocarbon group, produced by the method according to claim 8, and water having a hardness of equal to or higher than 100 mg/L (converted to calcium carbonate).

12. A washing method comprising washing with the graft polymer with a hydrocarbon group according to claim 9, and water having a hardness of equal to or higher than 100 mg/L (converted to calcium carbonate).

13. The detergent composition according to claim 7, wherein the content of the graft polymer is 0.1 to 15% by mass relative to the total amount of the detergent composition.

14. The detergent composition according to claim 7, wherein the detergent composition comprises a surfactant in an amount of 10 to 60% by mass relative to the total amount of the detergent composition.

15. The graft polymer with a hydrocarbon group according to claim 1, wherein in the formula (1), p represents 1.

16. The graft polymer with a hydrocarbon group according to claim 1, wherein in the formula (1), Y represents:

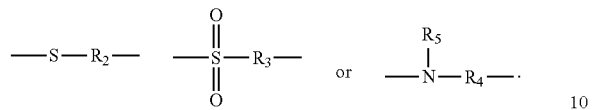

17. The graft polymer with a hydrocarbon group according to claim 1, wherein in the formula (1), r represents 1.

18. The graft polymer with a hydrocarbon group according to claim 1, wherein in the formula (1), r represents an integer of 2 to 6.

19. The graft polymer with a hydrocarbon group according to claim 1, wherein the graft polymer is water-soluble.

20. The graft polymer with a hydrocarbon group according to claim 1, wherein mass ratio of units derived from the polyoxyalkylene-based compound and units derived from the hydrophilic monomer, present in the polymer, is 99:1 to 80:20 units derived from the polyoxyalkylene-based compound: units derived from the hydrophilic monomer.

* * * * *